United States Patent
Alexander et al.

(10) Patent No.: US 10,416,274 B2
(45) Date of Patent: Sep. 17, 2019

(54) PASSIVE RADAR LOCATION OF OBJECTS

(71) Applicant: Cohda Wireless Pty Ltd, North Adelaide (AU)

(72) Inventors: Paul D. Alexander, North Adelaide (AU); John L. Buetefuer, North Adelaide (AU); Alexander J. Grant, North Adelaide (AU); Malik Khan, North Adelaide (AU)

(73) Assignee: Cohda Wireless, Wayville (AU)

( * ) Notice: Subject to any disclaimer, the term of this patent is extended or adjusted under 35 U.S.C. 154(b) by 383 days.

(21) Appl. No.: 15/223,551

(22) Filed: Jul. 29, 2016

(65) Prior Publication Data

US 2018/0031671 A1    Feb. 1, 2018

(51) Int. Cl.
| | |
|---|---|
| *G01S 5/02* | (2010.01) |
| *H04L 29/08* | (2006.01) |
| *G01S 5/06* | (2006.01) |
| *G01S 3/28* | (2006.01) |
| *G01S 3/46* | (2006.01) |
| *G01S 5/00* | (2006.01) |

(52) U.S. Cl.
CPC ............. *G01S 5/0273* (2013.01); *G01S 3/28* (2013.01); *G01S 3/46* (2013.01); *G01S 5/0072* (2013.01); *G01S 5/0252* (2013.01); *G01S 5/06* (2013.01); *H04L 67/12* (2013.01)

(58) Field of Classification Search
CPC .............................. H04W 64/00; G01S 5/0009

USPC ...... 455/507, 456.6, 456.3, 440, 414.1, 509, 455/456.2, 456.1; 342/572.1, 450
See application file for complete search history.

(56) References Cited

U.S. PATENT DOCUMENTS

| | | | |
|---|---|---|---|
| 9,083,419 B2 | 7/2015 | Alexander et al. | |
| 9,319,157 B2 | 4/2016 | Alexander et al. | |
| 2013/0030931 A1* | 1/2013 | Moshfeghi | G01S 19/48 705/16 |
| 2013/0114660 A1 | 5/2013 | Alexander et al. | |
| 2016/0037380 A1* | 2/2016 | Ozturk | H04L 5/001 370/331 |

* cited by examiner

*Primary Examiner* — Kiet M Doan

(57) ABSTRACT

A vehicle or other mobile communication entity (102) locates objects using received (typically radio frequency) signals (104, 106). These received signals included multi-path versions of the transmitted signals (104). The received signals may include packets having location information of the transmission source. The receiving vehicle may track, or know, its own position. The receiving entity may determine properties for a multi-path version of the signal (208, 210). These properties may include a delay, a Doppler and an angle of reception (122, 124) for one or more multi-path versions of the received signal. The receiving entity may also measure an imbalance (504) induced between a pair (or more) of antenna elements (302) for a particular multi-path version of the signal received. This imbalance may be dependent on the angle of arrival of the particular signal being received. In some embodiments of the invention, the measured imbalance includes two parts: a delta phase (dPhase, 400) and a delta Gain (dGain, 402). These delta values may be considered as a complex number with phase dPhase and magnitude dGain.

14 Claims, 6 Drawing Sheets

PASSIVE RADAR LOCATION OF OBJECTS

FIELD OF THE INVENTION

The present invention relates to the field of communications. More particularly, the present invention relates to using radio signals for the detection and location of objects.

BACKGROUND OF THE INVENTION

The IEEE 802.11p protocol is a "vehicle-to-vehicle" ("V2V") communications standard to allow mobile entities such as automobiles to interact with one another. This interaction includes the exchange of speed and direction information between the mobile entities. The information may be used to avoid collisions or to estimate the best route or path to proceed along when moving through traffic.

The 802.11p standard also contemplates communication between mobile entities and stationary hubs. This communication may involve exchange of information such as map or topographical information, toll payment, traffic and weather.

The benefits of communication standards such as 802.11p should be apparent. However, the deployment (or "roll-out") of vehicles with the necessary equipment could take many years, thus delaying full realization of these benefits. Some vehicles lacking 802.11p equipment may remain on the road long after the initial introduction. Therefore, one-hundred percent (100%) adoption of 802.11p may not take place for decades.

The slow roll-out of 802.11p reduces its usefulness of 802.11p equipped vehicles as they will not gain the benefits of V2V communication with unequipped vehicles. Thus, it is highly desirable to have a way of achieving at least some of the gains of V2V communications without requiring all vehicles to incorporate V2V equipment.

SUMMARY OF THE INVENTION

In accordance with one embodiment of the invention a vehicle or other mobile communication entity locates objects using received (typically radio frequency) signals. These received signals included multi-path versions (copies) of the transmitted signals. The received signals may include packets having location information of the transmission source. The receiving vehicle may track, or know, its own position.

In one aspect of the invention, the receiving entity may determine properties for a multi-path version of the signal. These properties may include a delay, a Doppler and an angle of reception for one or more multi-path versions of the received signal. The receiving entity may also measure an imbalance induced between a pair (or more) antenna elements for a particular multi-path version of the signal received. This imbalance may be dependent on the angle of arrival of the particular signal being received.

In some embodiments of the invention, the measured imbalance includes two parts: a delta phase (dPhase) and a delta Gain (dGain). These delta values may be considered as a complex number with phase dPhase and magnitude dGain. To assist with determining the imbalance the automatic gain control may be locked across antennas to avoid phase imbalance. Additionally, the powers and path lengths in the radio electronics may not be fully equalized across antenna elements so reduce manufacturing costs.

DETAILED DESCRIPTION OF THE EMBODIMENTS INVENTION

Figure 1:
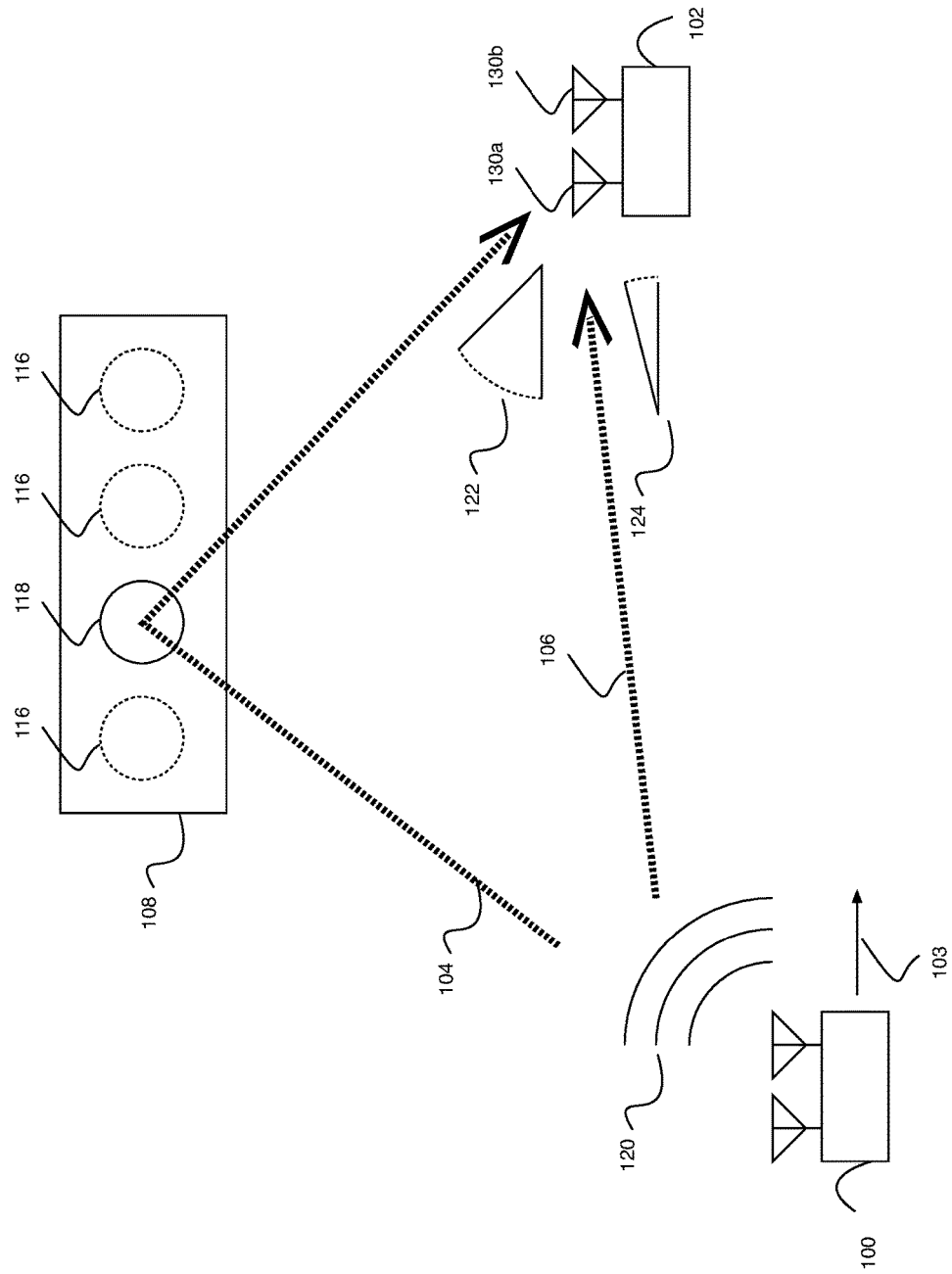
FIG. 1 is a block diagram of some mobile vehicles communicating in a manner consistent with the use of some embodiments of the invention.

FIG. 1 is a block diagram of some mobile vehicles communicating in a manner consistent with the use of some embodiments of the invention. Vehicle 100 (a mobile communication entity) is transmitting packets via radio signals 120 while moving in direction 103 with a certain velocity. The radio signals travel through path 104 and path 106. Path 106 is a line-of-sight path that has an angle of arrival 124. Path 104 is a reflected path that has angle of arrival 122.

Receiver vehicle 102 has antennas 130. In the described embodiment antennas 130 are comprised of at least two antennas (shown as antenna 130a and antenna 130b), although the use of a single antenna is consistent with some embodiments of the invention.

As shown in FIG. 1, signal path 104 includes a reflection from wall 108. The reflection takes place at location 118 on wall 108. Other reflection locations 116 are shown for previous (or subsequent) reflected signals received by vehicle receiver 102. The locations of reflections 116 and 118 may be stored together in an object database. The object database may "join" various reflections to form the objects such as wall 108. The objects may be correlated with known structures or terrain features to assist in location determination. The know structures or terrain features may be part of a terrain (or map) database also available to the receiving vehicle.

The current location of the vehicle, as well as the vehicles direction, may be compared to the location of objects in the object database to determine if a collision or course correction is required. If a collision is predicted a course correction can be preformed. The course correction may include a complete stop.

During exemplary operation, vehicle 102 will receive copies, or versions, of data packets transmitted using signals 120. The copies are received via path 104 and path 106, for example. Typically, the delay difference between line-of-sight path 104 and reflected path 106 will be smaller than the duration of the packet, which leads to inter-symbol-interference.

In the described embodiment, signals 120 are generated using an orthogonal frequency division multiplex (OFDM) waveform, however other embodiments of the invention may use, for example, single carrier waveforms or code division multiple access (CDMA) waveforms.

Figure 2:
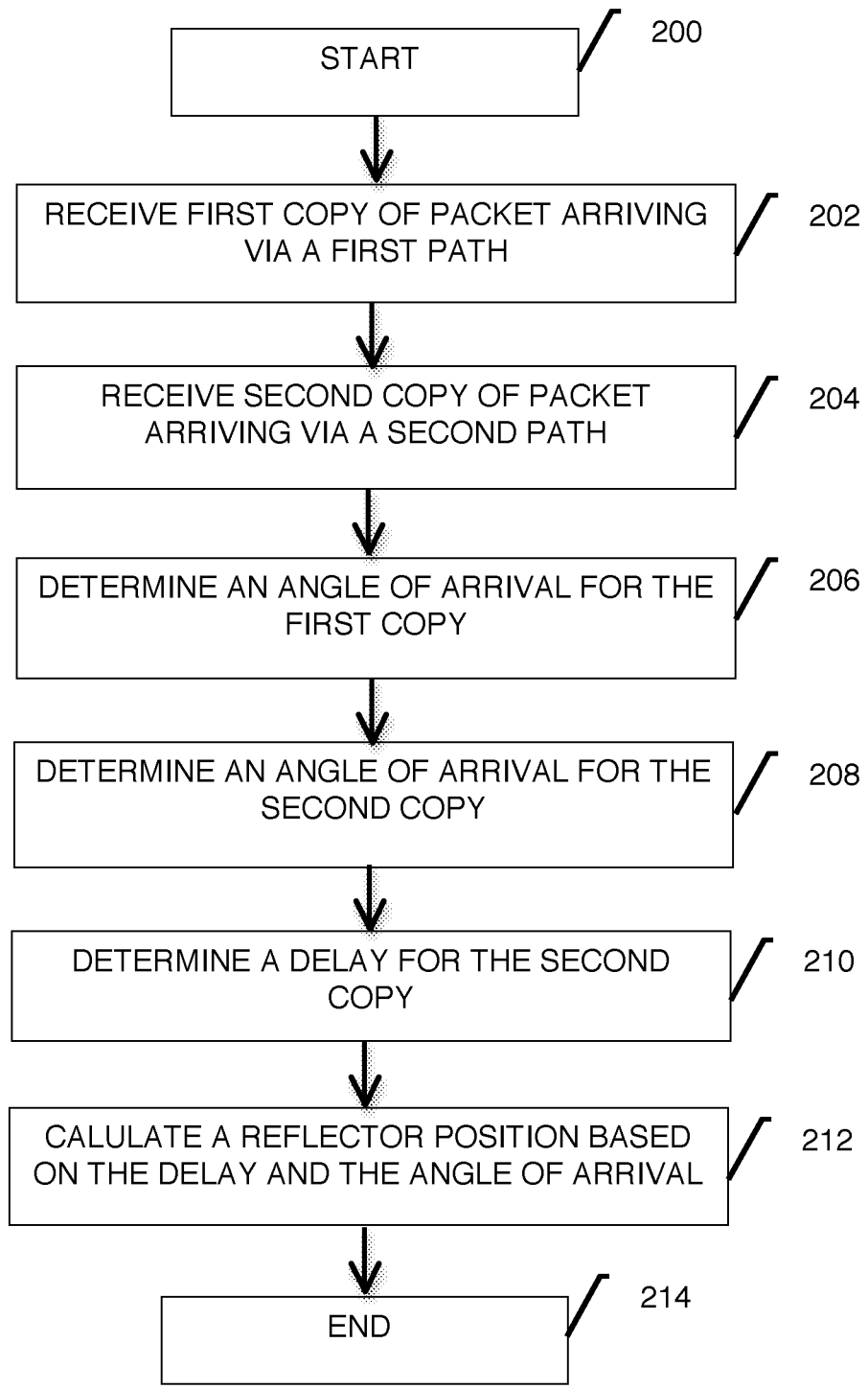
FIG. 2 is a flow chart illustrating the steps performed in accordance with one embodiment of the invention.

FIG. 2 is a flow chart illustrating the steps performed in accordance with one embodiment of the invention. The process begins at step 200 and at step 202 the first copy of a packet is received after arriving via a first path. At step 204 a second copy of the packet is received via a second path. At step 206 an angle of arrival for the first copy of the packet is determined. At step 208 an angle of arrival for the second copy of the packet is determined. At step 210 a delay for the second of the packet is determined. At step 212 a reflector position is calculated based on the delay and at least one of the angle of arrivals previously determined. The process ends at step 214.

In accordance with some embodiments of the invention, the packet may be transmitted using an OFDM waveform. Typically, at the receiving system one or more Fast-Fourier transform (FFT) may be performed as part of the receive process. This allows receivers to execute the equalization and demodulation functions in the frequency domain in accordance with normal OFDM receive processing. In order to execute these tasks a frequency domain channel estimate is created in the OFDM receiver. The frequency domain channel creates "features" which are caused by multipath. The features are defined in terms of time domain behaviours. That is, these frequency domain estimates include features induced by a set of time-domain "taps," which generally correspond to multipath versions of the received signal. The precise estimation of the time-domain parameters from the Frequency domain parameters is shown, for example, in U.S. Pat. No. 9,083,419 "Estimation of a multipath signal in a wireless communication system" incorporated herein by reference in its entirety.

Additionally, other parameters may be used during the receive packet processing. One example of the processing of other signal related parameters is described in U.S. patent application Ser. No. 13/511,663 entitled "Extracting Parameters from a Communications Channel" assigned to the assignee of the present invention and incorporated herein in its entirety by reference.

In one embodiment of the invention a time domain estimator (TDE) may be used for the various parameter determinations. The TDE may be used to estimate parameters such as tap delay, Doppler and complex gain (power and phase) from the Frequency Domain (FD) channel information. In addition, if two or more antennas worth of FD channel information from a specific packet is available, the complex antenna gain imbalance could also be estimated.

In summary, in the exemplary embodiment described herein the multipath signal (tap) arriving at the antenna system is modeled by (at least) the following parameters:
  Complex gain of the tap
  Delay of the tap
  Doppler shift of the tap;
  and if more than one antenna element
  Delta gain across the antenna elements
  Delta phase across the antenna elements It will be known to those skilled in the art that Delta phase across an antenna array can be used to infer Angle of arrival.

In an exemplary receive processing, the raw frequency domain channel estimates will be generated by the receive system for further analysis. These channel estimates are represented by "Hf." In one embodiment of the invention, Hf is a three dimensional matrix whose element represents the complex channel response at antenna a, symbol m and sub-carrier k, [m,k,a]. Hf is used as the input to the time domain estimator ("TDE"), which then computes time domain channel parameters for each tap of the multipath channel. A tap here represents the path a radio wave took from a given Tx to an Rx.

Hf is preferably left as raw as possible as filtering or other conditioning might manifest as false taps. TDE performs successive cancellations of the found taps from the 3D FFT buffer Ht=FFT3D (Hf) are performed until the specified number of taps are found. Here Ht is the 3D FFT buffer of the raw frequency domain channel estimate Hf.

In an exemplary processing, for each tap the following steps may be performed (preferable on Ht):
  a. Find a coarse estimate of tap parameters, namely delay, Doppler and delta Phase. This may be done via a max search and quadratic interpolation
  b. Refine the coarse estimates of tap parameters jointly with all previously estimated taps. This may be done jointly using, for example, a non-linear algorithm such as Levenberg-Marquardt least square optimization algorithm.
  c. Generate a hypothesis based on the current refined channel tap estimates. This may be followed by joint least square estimation of complex tap gains.
  d. The current taps hypothesis (or contribution) may then be removed from Ht to find further taps The above processing is preferably executed on a transformed version of the Hf array where a 3D FFT is applied to Hf, notionally converting back to the Time-Domain resulting in a Ht.

The set of Ht arrays is represented by a set of delay bins, Doppler bins and antenna bins [NDelayBins, NDopplerBins, NdPhaseBins]. Each bin containing the complex gain at that Delay, Doppler and dPhase bin. The Ht array is used to construct a residual array from which taps, or signals, are iteratively removed. Each removal of a multipath signal yields and improved (less noisy) version of the remaining received signals due to remaining taps.

The dimensions of Ht are represented by a set of Delay bins, Doppler bins and antenna delta phase bins [NDelayBins, NDopplerBins, NdPhaseBins]. Each bin preferably containing the complex gain at that Delay, Doppler and dPhase bin. This 3-D array Ht could also be viewed as a 1-D vector array r of length n=NDelayBins×NDopplerBins×NdPhaseBins. A person familiar with the art will appreciate that in device memory multi-dimensional arrays are generally stored sequentially and a flattened view as an array could easily be derived. r is such a flattened view of Ht. The r array is used to construct a residual array from which taps, or signals, are iteratively removed. Each removal of a multipath signal yields an improved (less noisy) version of the remaining received multipath signals.

By collapsing the information if Ht into a vector and possibly selecting a subset of bins near the centre of the three dimensions we have the "original" observation vector r, which the iterative processing to recover time domain taps will be applied.

Once a tap is estimated, its parameters are stored in an array, whose elements are estimates of delay, Doppler, complex tap gain, dGain and dPhase. At the end of each loop this tap parameter is stored in a taps list database. These Tap parameters are also used to generate the hypothesis vectors for each tap.

In one embodiment of the invention, the coarse estimate is performed by finding the peak magnitude (absolute value of complex value in bin) over all bins in the flattened residual vector r' initialized to residual vector r which is a flattened view of the 3D Ht structure. or equivalently the flattened vector r representing a subset of the same. This peak is used as the first tap, or multipath signal. Interpolation may be used in finding this peak. While initially estimated as bin aligned, the interpolated tap will be represented by a continuous Delay, Doppler and dPhase that may not correspond to a bin centre of the 3D FFT output Ht.

The refinement performed tries to optimize the coarse parameters by choosing the ones, without constraint to bin values with the least residual error. A nonlinear least squares search is typically used for such a task where gradients of the error surface are locally estimated and small steps taken in directions set by this gradient. Preferably, the parameters of all taps from 1 up to and including the most recently estimated tap in the coarse estimation step are jointly refined. Their previous may bee values are used as a starting value for the refiner.

In one embodiment, an additional value is also included in the model for joint refinement, the gain imbalance between the antennas for the tap. Thus, the tap may be modeled as having a delay, a Doppler shift, a Phase difference (dPhase) across the antenna elements. A Gain difference (dGain) across the array may also be added. There is no requirement that the antenna elements be arranged in a particular array structure, such as a linear array. In one embodiment of the invention, the non-linear searcher may now try to improve the fit to the 3D Ht observation by variation of this fourth parameter (Gain Difference) of the tap in addition to all other parameters.

The hypothesis-contribution generation is performed based on the updated tap parameters. The per-tap contribution is first calculated, which is followed by a computation of the least square estimate of the complex gains.

The per tap contribution is formed based on the realization that Delay, Doppler and dPhase may be thought of as frequencies in the 3D Ht buffer. As these "frequencies" will not in general be aligned to the bin centers of the 3D Ht FFT care must to taken in the reconstruction to account for any misalignment (hypothesis generation) to account for any misalignment. In one embodiment of the invention, the initial hypothesis for a tap p is where S, G and X are FFT of the frequencies corresponding to the parameters of Doppler, delay and dPhase respectively at the FFT bins. Where is the tensor product. The dimensions of the generated hypothesis are the same as that of the residual vector r' or Ht.

The other two parameters of the tap dGain and complex gain may also be included in the reconstruction. The Antenna dGain is included via modification of the Delay contribution. The set of complex gains of each tap may be calculated jointly from the original observation r using a linear least squares estimate. The linear estimator is formed by arranging the C matrices for each tap into columns of a matrix D by filling column p of D with a flattened version of C(p) then forming the Moore-Penrose pseudoinverse $A=(D'*D)^{-1}D'$. The Least Squares estimate of each taps complex gain is then the vector a_ls=Ar.

Finally, the contribution for each tap is removed from vector r to create a new residual r' that may have as yet undiscovered taps present. For all taps up to the current tap p their contribution can be conveniently computed from the matrix D from the previous step. The hypothesis of all taps detected so far is r_hat=D a_ls. D is an n×p contribution matrixupto tap p, where n is the number of elements in the contribution e.g. in one embodiment n is equal to NDelayBins×NDopplerBins×BdPhaseBins. The value a_ls is a p×1 vector of complex gains of p taps as calculated previously by least squares. This hypothesis can be simply subtracted from the original observation r. and the residual vector could be updated i.e. r'=r−r_hat. The r_hat is initialized as zeros and thus in the first iteration r' is initialized as r (flattened view of Ht).

Once the current hypothesis is removed, a new iteration may be performed, starting with a new coarse search performed on the updated vector r'. Although it is preferred to find one tap during the new course search performed during each iteration, it is also possible to find two of more peaks in the coarse search. This would then allow the removal of two or more taps from the observation per iteration.

Also, although it is preferred to jointly optimize the parameters describing all taps in the refinement phase, it would alternatively be possible to reduce complexity by reduced the set of parameters to be optimized by selected and subset of taps and/or a subset of parameters to be "tuned" in the start if refinement operation. Any parameter excluded from the refinement phase would be left at its current value at the start of the refinement operation.

Figure 3:
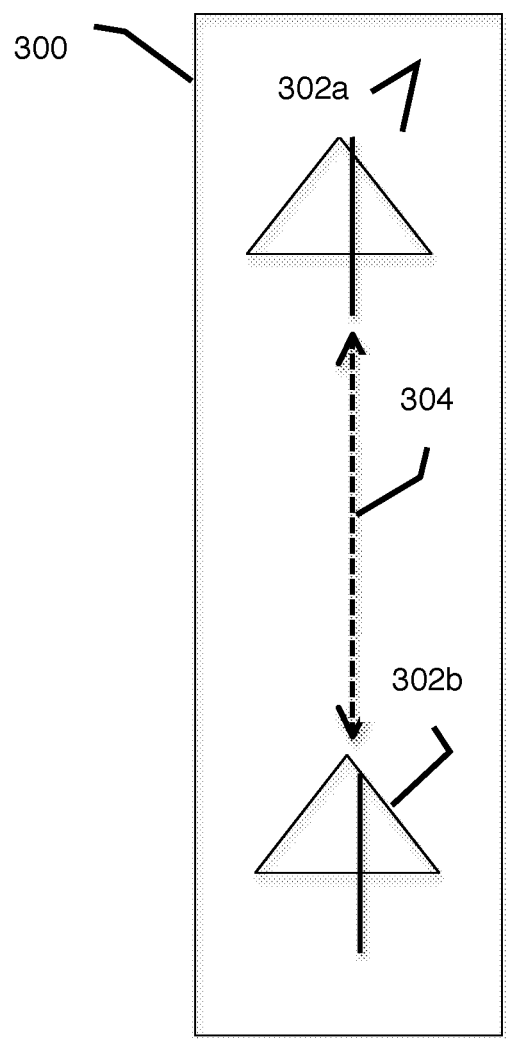
FIG. 3 is a diagram of a vehicle (e.g. receiver) configured in accordance with one embodiment of the invention.

FIG. 3 is a diagram of a vehicle (e.g. receiver) configured in accordance with one embodiment of the invention. Vehicle 300 is configured with antenna 302a and antenna 302b. While two antennas are shown, other embodiments of the invention will use more than two antennas, while still other embodiments may use just one antenna.

In one embodiment of the invention, antennas 302 are placed on an axis of separation 304 and separated by a given distance. The given distance is preferably slightly less than one-half (½) the wavelength of the RF signals used to transmit the packets. Additionally, antennas 302 have a directional gain and phase characteristic and they are preferably configured so that the highest gain of each antenna is in a different orientation than the other antenna 302. For example, antenna 302a may be oriented approximately 180 degrees from antenna 302b with regard to the highest direction of gain. Additionally, the preferable gain orientation for each antenna 302 is approximately 90 degrees form the axis of separation 304.

Antennas 302 preferably have a known gain and phase imbalance. That is, the gains of antennas 302 are different from one another and that gain difference is known. This may be done by antenna design or via special selection and characterization of antennas chosen at random (for example, from a manufacturing line). That is, the gain of the antennas is measured at time of manufacture and then the antennas are positioned based on that measurement, thus allowing for lower cost antennas with more variable characteristics to be used.

In one embodiment of the invention, the characterization of antennas 302 is done by the determination of a dGain and a dPhase value for each antenna 302 for a series of receive directions. That is, signals may be transmitted to the antenna system from a set of direction (or angles) and the dGain and dPhase for each direction is measured and stored in an imbalance database available to the vehicle during normal operation.

It is useful, in some embodiments, to think of the imbalance of antennas 302 as a complex number having a phase and a magnitude. Accordingly, the dPhase value is stored as the phase and the dGain value is stored as the magnitude or the dPhase value is stored as the IN-Phase and the dGain (possible scaled by a fixed factor Alpha) value is stored as the Quadrature. In an exemplary embodiment, the dPhase and dGain of an antenna system may be measured at five (5) degree increments, for a total of 72 measurements to be stored in the imbalance database.

In a more detailed description of one embodiment of the invention, the antenna imbalance may be defined as h2/h1 where h2 is the complex channel seen on antenna 302a and h1 is the complex channel seen on antenna 320b. For example, if a signal arrives at antenna 302a with an angle of 1 radian then the magnitude of the tap (path or copy) may be 7 dB smaller than that of antenna 302b. Also, a phase shift (principally) due to the different path length to the two antennas might be −2.5 Radians. The resulting complex number could be mapped to an "imbalance" as Alpha*dGain dB+j dPhase=Alpha*(−7)−j 2.5.

Using the imbalance database the corresponding dPhase and dGain values are used to identify the closes to entries into the database by comparing the constructed Imblance value to the database of Imblance values (and their corresponding Angle of arrivals "AoAs"). The corresponding angles of arrival are determined using the database and the closest value is selected. Interpolation may also be performed. The effect of scaling factor Alpha is to bias the AoA "decoder" to use dGain or dPhase as the principle guide for AoA selection.

Figure 4:
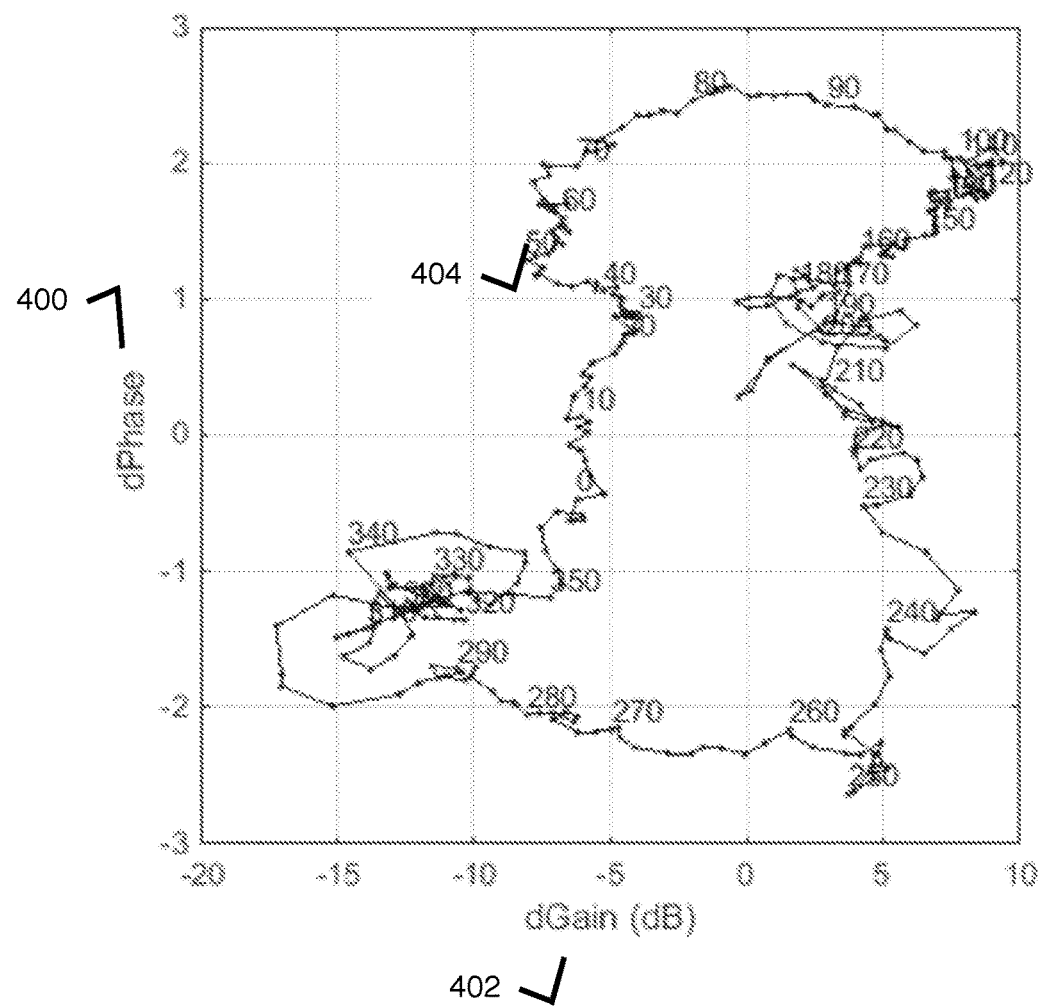
FIG. 4 is a graphical illustration of the storage of dPhase and dGain data in the imbalance database when configured in accordance with one embodiment of the invention.

FIG. 4 is a graphical illustration of the storage of dPhase and dGain data in the imbalance database when configured in accordance with one embodiment of the invention. The dGain values 402 are graphed on the X-axis and the dPhase values 400 are graphed on the y-axis. The resulting angles of arrival 404 are plotted on the graph. While not a perfect circle, or arc, the resolution of these exemplary measured values provides significant indication of the angle of arrival of any signals received by a receiving vehicle configured in accordance with some embodiments of the invention.

Figure 5:
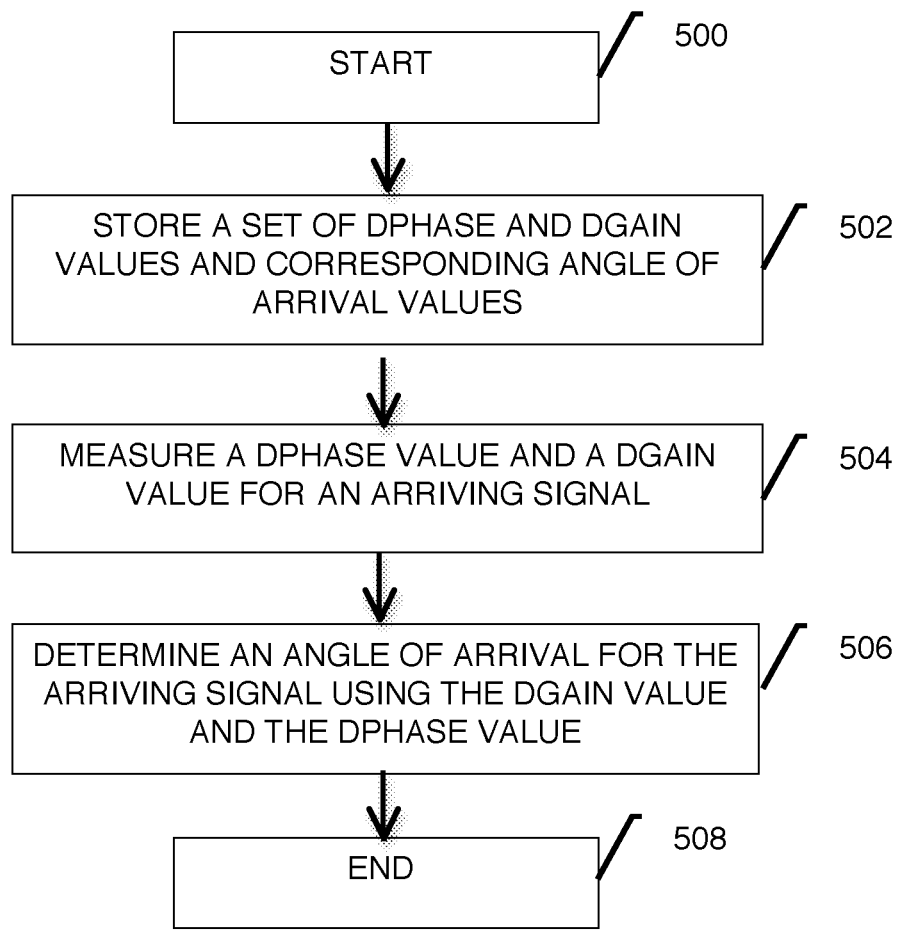
FIG. 5 is a flow chart illustrating the steps performed in accordance with one embodiment of the invention.

FIG. 5 is a flow chart of steps performed in accordance with one embodiment of the invention. Step 500 is the start. Step 502 stores a set of dPhase and dGain values and corresponding angle of arrival values. Step 504 measures a dPhase value and a dGain value for an arriving signal. Step 506 determines an angle of arrival for the arriving signal using the dGain value and the dPhase value. The processing ends at step 508.

Figure 6:
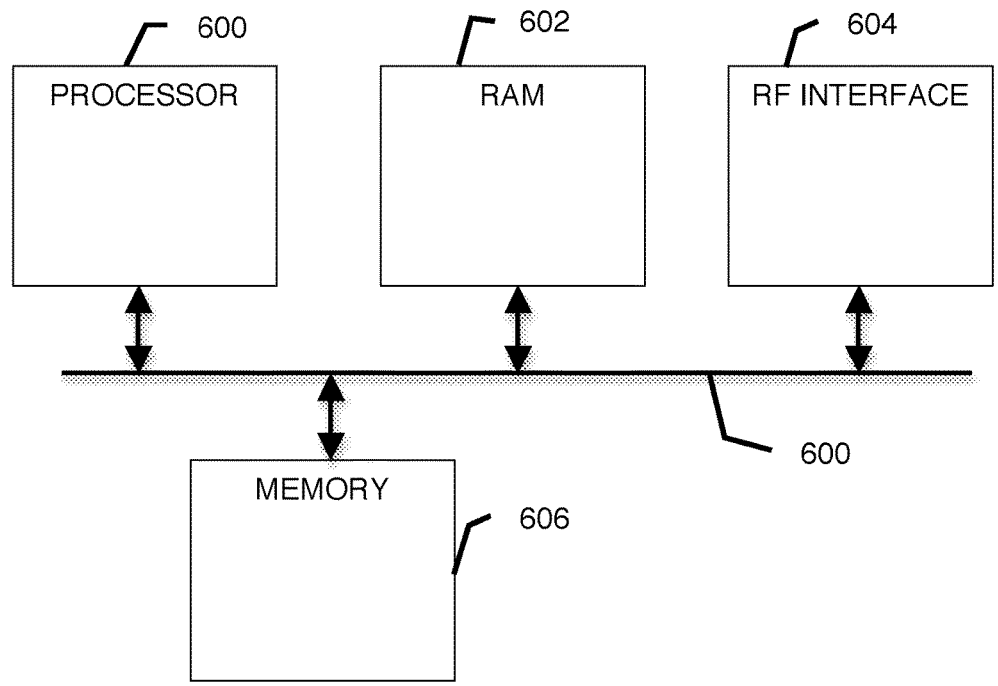
FIG. 6 is a block diagram of a mobile receiver when configured in accordance with one embodiment of the invention.

FIG. 6 is a block diagram of a mobile receiver when configured in accordance with one embodiment of the invention. In this embodiment processor 600 is coupled to random access memory (RAM) unit 601 and RF interface 604 via bus 600. Additionally, memory unit 606 is coupled to bus 600. Memory 606 is typically a hard disk drive or some form of non-volatile memory including solid-state storage devices.

During exemplary operation, software instructions stored in memory 606 are applied to processor 600 and RAM 602 via bus 600. Processor 600 controls RF interface 604 via bus 600 in response to these software instructions. Additionally processor 600 exchange data with RF interface 604 including information that is received and transmitted via RF interface 604.

Processor 600 will receive the information provided by RF interface 604 including the information transmitted as well as the various characteristics of the RF signals received that are discussed throughout this application including delay, Doppler, phase and gain. In response to the information and software instructions processor 600 will performed the various steps described throughout the application.

Other embodiments of the invention include:

A method for determine the angle of arrive of a packet received at an access point comprising the steps of receiving a packet on a first antenna at a first signal strength; receiving said packet on a second antenna at a second signal strength; calculating said angle of arrival using a difference in signal strength between said first signal strength and said second signal strength and a relative gain difference between said first antenna and said second antenna.

In one embodiment of the invention said angle of arrival is further calculated using a first gain pattern for said first antenna and a second gain pattern for said second antenna.

In another embodiment of the invention, a vehicle assist system is comprised of a communication system for locating reflectors based on reflected signals; a structure database for storing structures based on one or more reflectors; a control system for changing a movement of said vehicle based on a location, a direction of motion and said structure database.

Another embodiment of the invention is further comprised of an antenna system for receiving RF signals having a dPhase and a dGain; imbalance database for storing dGain and dPhase pairs with corresponding angle of arrival; control system for determining an angle of arrival of a signal using said dPhase and said dGain and said imbalance database.

In another embodiment of the invention said control system changes the speed of said vehicle if said location and said direction of motion indicate a collision is imminent.

In accordance with another embodiment of the invention, software instructions, stored in a storage medium, that when applied to a processor system have and RF interface causes the following steps to be performed: storing a set of dPhase and dGain pairs with corresponding angle of arrival values; measuring a dPhase value and dGain value for said signal; and determining an angle of arrival based on said dPhase value and said dGain value using said set of dPhase and dGain pairs.

In accordance with another embodiment of the invention, an access point for receiving packets via a wireless transmission comprises a first antenna oriented in a first direction and having a first gain factor and a second antenna oriented in a second direction and having a second gain factor.

In another embodiment of the invention said first orientation is substantially opposite to said orientation.

In another embodiment of the invention the first antenna and the second antenna are separated by slightly less than one-half of a transmission signal wavelength.

Another embodiment of the invention includes a database of antenna gains for said first antenna and said second antenna.

In another embodiment of the invention the database of antenna gains contains gain information and phase information in an I,Q chart configuration.

Thus, a method and apparatus for locating the position of objects via received radio signals has been described. While various embodiment of the inventions have been set forth, the invention should not be limited to those described embodiments. Rather, the scope of the invention is set forth more particularly in the following claims.

The invention claimed is:

1. A method for determining the location of a mobile transmitter sending packets to a first access point and a second access point, comprising the steps of:
   a) receiving a first set of packets at said first access point;
   b) receiving a second set of packets at said second access point;
   c) generating a first frequency domain channel estimate for said first set of packets, said frequency domain estimate including features caused by multipath;
   d) generating a first time domain estimate from said first frequency domain channel estimate, wherein said first time domain estimate includes distance, doppler and angle of arrival;
   e) generating a second frequency domain channel estimate for said second set of packets, said second frequency domain estimate including features caused by multipath;
   f) generating a second time domain estimate from said second frequency domain channel estimate, wherein said second time domain estimate includes distance, doppler and angle of arrival;

h) calculating a location of said mobile transmitter by triangulation using an angle of arrival from said first parameter set and an angle of arrival from said second parameter set, wherein
said first frequency domain channel estimate and said second frequency domain channel estimate are configured in a three-dimensional matrix having complex channel response, symbol number and subcarrier as the three dimensions respectively.

2. The method of claim 1 wherein step d) is performed using the steps of:
   d.1) calculating a coarse estimate of tap parameters from said first frequency domain estimate, said tap parameters including delay, Doppler and delta Phase;
   d.2) generating a refined estimate of tap parameters from said coarse estimate of tap parameters using previously estimated tap parameters;
   d.3) generating a tap hypothesis based on said refined estimate; and
   d.4) removing said tap hypothesis from said refined estimate, thereby generating an improved refined estimate.

3. The method of claim 2 wherein steps d.1) through d.2) are performed again on said improved refined estimate.

4. The method of claim 2 further comprising the step of:
   storing a tap estimate tap list database;
   generating hypothesis vectors for each tap in said tap list database.

5. The method of claim 4 wherein step d.1) is performed via the steps of:
   selecting taps with the least residual error;
   refining taps in said tap list database.

6. The method of claim 2 wherein said frequency domain channel estimate also includes an antenna gain imbalance.

7. A communications device for determining its location comprising:
   means for receiving a first set of packets at said first access point;
   means for receiving a second set of packets at said second point;
   calculating first parameter set for a first selected packet from said first set of packets;
   means for generating a first frequency domain channel estimate for said first set of packets, said frequency domain estimate including features caused by multipath;
   means for generating a first-time domain estimate from said first frequency domain channel estimate, wherein said first time domain estimate includes distance, doppler and angle of arrival;
   means for calculating second parameter set for a second selected packet from said second set of packets;
   means for generating a second frequency domain channel estimate for said second set of packets, said second frequency domain estimate including features caused by multipath;
   means for generating a second time domain estimate from said second frequency domain channel estimate, wherein said second time domain estimate includes distance, doppler and angle of arrival;
   means for calculating a location of said mobile transmitter by triangulation using an angle of arrival from said first parameter set and an angle of arrival from said second parameter set, wherein
   said first frequency domain channel estimate are configured in a three-dimensional matrix having complex channel response, symbol number and subcarrier as the three dimensions respectively, and said first parameter set and said second parameter set include distance, Doppler an angle of arrival.

8. The communications device as set forth in claim 7 wherein said means for generating a first channel estimate is comprised of:
   means for finding a coarse estimate of tap parameters, said tap parameters including delay, Doppler and delta Phase;
   means for generating a refined estimate of tap parameters from said coarse estimate of tap parameters using previously estimated tap parameters;
   means for generating a tap hypothesis based on said refined estimate; and
   means for removing said tap hypothesis from said refined estimate, generating an improved refined estimate.

9. The communication device as set forth in claim 8 wherein said means for generation a refined estimate and said means for generating a tap hypothesis also process said improved refined estimate and results generated therefrom.

10. The communication device as set forth in claim 9 further comprising:
    means for storing a tap estimate in a tap list database;
    means for generating hypothesis vectors for each tap in said tap list.

11. The communication device as set forth in claim 9 further comprising:
    means for selecting taps with a least residual error;
    refining taps in said tap list database.

12. A method for determining the location of a mobile transmitter sending packets to a first access point and a second access point, comprising the steps of:
    a) receiving first set of packets at said first access point;
    b) receiving a second set of packets at said second access point;
    c) generating a first frequency domain channel estimate for said first set of packets, said frequency domain estimate including features caused by multipath;
    d.1) finding a coarse estimate of tap parameters from said first frequency domain estimate, said tap parameters including delay, Doppler and delta Phase;
    d.2) generating a refined estimate of tap parameters from said coarse estimate of tap parameters using previously estimated tap parameters;
    d.3) generating a tap hypothesis based on said refined estimate; and
    d.4) removing said tap hypothesis from said refined estimate, generating an improved refined estimate;
    e) generating a second frequency domain channel estimate for said second set of packets, said second frequency domain estimate including features caused by multipath;
    f) generating a second time domain estimate from said second frequency domain channel estimate, wherein said second time domain estimate includes distance, doppler and angle of arrival;
    said first parameter set and said second parameter set include distance, Doppler an angle of arrival;
    h) calculating a location of said mobile transmitter by triangulation using an angle of arrival from said first parameter set and an angle of arrival from said second parameter set.

13. The method as set forth in claim 12 wherein steps d.1 and d.2 are also performed on said improved refined estimate.

14. The method of claim 12 further comprising the step of:
    storing a tap estimate tap list database;

generating hypothesis vectors for each tap in said tap list database.

\* \* \* \* \*